Sept. 18, 1923.   1,468,571
G. M. McGINLEY
FOOT REST FOR ACCELERATOR PEDALS
Filed July 12, 1922
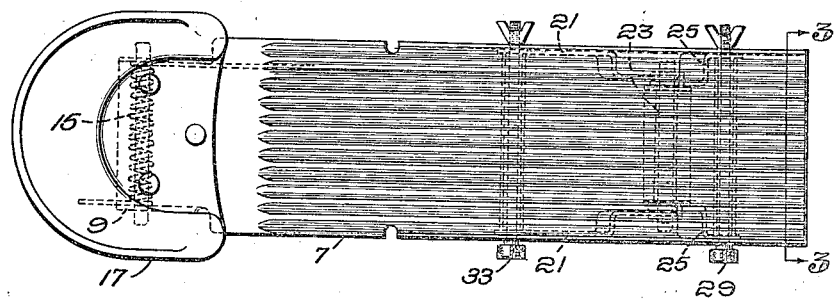
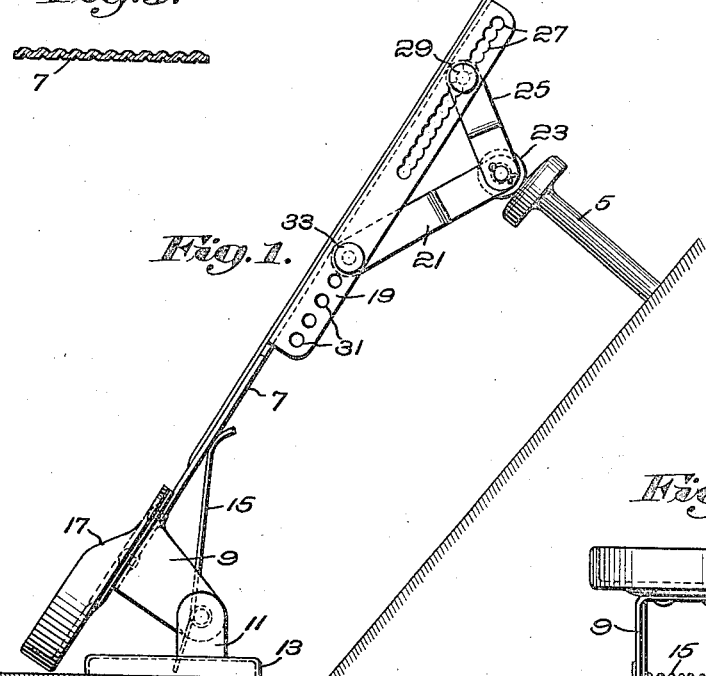
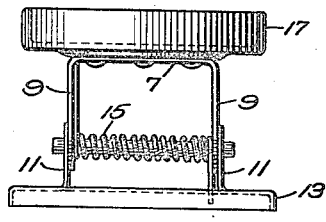

Patented Sept. 18, 1923.

1,468,571

UNITED STATES PATENT OFFICE.

GEORGE M. McGINLEY, OF AMESBURY, MASSACHUSETTS, ASSIGNOR TO G. W. J. MURPHY COMPANY, OF AMESBURY, MASSACHUSETTS, A CORPORATION OF MASSACHUSETTS.

FOOT REST FOR ACCELERATOR PEDALS.

Application filed July 12, 1922. Serial No. 574,536.

*To all whom it may concern:*

Be it known that I, GEORGE M. MCGINLEY, a citizen of the United States, and a resident of Amesbury, county of Essex, and State of Massachusetts, have invented an Improvement in Foot Rests for Accelerator Pedals, of which the following description, in connection with the accompanying drawings, is a specification, like characters on the drawings representing like parts.

This invention relates to a foot rest or treadle adapted particularly for use in operating the depressible pedal, whether the latter is in the nature of a button or of a swinging treadle, which controls the throttle of an automobile engine. The purpose is to provide a device of simple and cheap construction, efficient for the purpose and adaptable to application to accelerator pedals of widely varying construction and dimension.

In order that my invention may be more readily understood I will describe the one particular form thereof which I have shown by way of example in the accompanying drawings, wherein:

Fig. 1 is a side elevation of the treadle in position;

Fig. 2 is a plan thereof;

Fig. 3 is a section on the line 3—3 of Fig. 2; and

Fig. 4 is a rear end elevation with the pedal depressed to show parts more clearly.

Referring to Fig. 1 of the drawings I have there shown the device as applied to a throttle controlling mechanism of the type utilizing a depressible plunger or button 5, although it will be understood that the device shown and other devices embodying the principles of my invention may be applied to throttle operating devices of different types. Referring to the drawings the treadle there shown embodies a foot receiving plate 7, conveniently formed of sheet metal and provided adjacent one end with the flanges or ears 9 adapted to be pivoted between struck up ears 11 on a hollow sheet metal base member 13 secured to the floor boards of an automobile. A suitable spring 15 coiled around the pivot pin may be provided normally to tilt the foot rest 7 to the position shown in Fig. 1, leaving the pedal 5 in its undepressed position. A heel seat 17 may be provided and in the embodiment of the invention illustrated it is formed from a separate stamping securing to the end of the plate 7, in the present instance rigidly and without capacity for adjustment. As best shown in Fig. 3, the plate 7 may be roughened or corrugated to give a grip to the foot and this is conveniently effected by embossing the metal as shown.

While other means than those here shown of associating with the foot rest the other elements of the construction might be provided, I prefer to provide lateral flanges 19 on the foot rest 7 and adjacent one end of the foot rest near the pivotal end is secured, as by means of these flanges, a pressure member adapted to bear on the pedal 5 or like element and herein this pressure member consists of a cross-bar supported by a pair of links 21 pivoted to flanges 19 and conveniently takes the form of a roller 23 journalled on a pin connecting the outer ends of the links 21. To position the roller other links 25 are provided pivoted at one end to the journal of the roller and at the other end to the flanges 19 and, it will be noted that the parts 7, 21 and 25, being three in number and having three pivot points, form a trussed frame which is indeformable and consequently the roller 23 is rigidly related to the plate 7.

To adjust the relative angularity of the pressure member 23 and the foot rest 7 so as to dispose the latter in the most advantageous position and fit the same to the position of the pedal 5 whatever it may be, the connection of the links 25 to the foot rest 7 is made adjustable, as by providing a series of holes 27 in the flange adapted to receive the pivot pin 29. In the embodiment of the invention here shown a compensating adjustment is provided so that the position of the roller 23 may be altered both laterally of the foot rest 7 and longitudinally thereof. Thus, in the case of a rectilinearly movable pedal 5 as shown the position of the roller 23 may be so adjusted that the arc of its movement around the pivotal center of the device on the ears 11 may be caused to approximate with the direction of movement of the button 5 and in this and other constructions the amount of movement of the pressure member relative to the pedal may be minimized and the use of a single anti-friction roller such as 23 facilitated. The compensating adjustment may be effected by providing a series of openings 31 in the flanges 19 receiving the pivot pin 33 by which the links 21 are connected to the foot rest.

It will be noted that while the member 7 may be made of sheet metal and corrugated as shown, the pressure is applied to the pedal 5 by means of a pressure member, in the present instance embodying the links 21 and roller 23, which presents a perfectly smooth surface to the pedal instead of a roughened under-surface such as is provided on the element 7 by the embossed corrugations and thus any transverse movement between such member and the pedal in the depressing movement of the latter is easy. In the embodiment of the invention shown the contact of the pressure member with the pedal is a rolling contact provided by the anti-friction roller 23, thus facilitating the movement to compensate for any slight inaccuracy of the arc of movement of the member 23 as compared with the direction of movement of the pedal 5 and, in the case of depressible pedals which swing downwardly, permitting such movement without undue friction.

Because of the adjustments provided the foot rest or treadle as a whole may obviously be adapted and fitted to existing automobiles of varying types of construction so as to insure most efficient action of the pressure applying member on the pedal and providing also for such an angular adjustment of the foot rest 7 proper that the foot will rest easily thereon and a portion of the pressure be taken up by the pivot so that in the jouncing of the car the pressure of the foot will not involuntarily vary but an even pressure may be maintained on the accelerator pedal without muscular tension and fatigue. The invention adapts itself, as is demonstrated by the illustrated embodiment thereof, to simple construction from sheet metal parts and the adjustments are readily effected and once made are secure.

Having thus described in detail the form of my invention shown, which obviously is here presented as an example of the invention only, and without attempting to set out the variations which might be made without departing from the spirit of the invention, I will define the scope and the novel subject matter thereof which I wish to secure by Letters Patent in the following claims:

1. A pedal for the purpose described comprising a foot receiving plate, a pivoted pressure member and an adjustable link between the two, the parts recited being related in the manner of a trussed frame.

2. A pedal for operating depressible devices comprising a foot receiving plate, means for pivoting the same adjacent one end, pairs of links pivoted to the sides thereof and a pressure applying cross-bar supported by the ends of said links.

3. A pedal for operating depressible devices comprising a foot receiving plate, means for pivoting the same adjacent one end, pairs of links pivoted to the sides thereof and adjustable therealong and a pressure applying cross-bar supported by the ends of said links.

4. A pedal for operating depressible devices comprising a foot receiving plate, means for pivoting the same adjacent one end, pairs of links pivoted to the sides thereof, a journal supported by the ends of the links and a roller on said journal.

5. A foot rest or treadle for operating depressible devices comprising two spaced members, one of which is a foot receiving plate, pivotally connected adjacent one end and adjustably connected at the other end by means of a link to adjust the relative angle or inclination of the two.

6. A foot rest or treadle for operating depressible devices comprising a foot receiving plate pivoted adjacent one end, a pressure applying roller and means for mounting it on the plate having provision for adjusting it both longitudinally of the plate and toward and away from the same.

7. A foot rest or treadle for operating depressible devices comprising a sheet metal foot rest pivoted adjacent one end and embossed to provide a grip for the foot, a pressure applying element swingably mounted on said foot rest adjacent the pivoted end thereof and presenting a smooth surface for contact with said device and a link between said foot rest and element for propping the latter in position relative to the former.

8. A foot rest or treadle for operating depressible devices comprising a laterally flanged foot rest having means for pivoting it adjacent one end, a series of holes in said flanges, a pressure member having a pivotal pin connection to the rest by means of said holes, a link pivoted to said rest and a second series of holes in said flanges to connect with the link.

In testimony whereof, I have signed my name to this specification.

GEORGE M. McGINLEY.